US012689972B2

(12) United States Patent
Sun et al.

(10) Patent No.: US 12,689,972 B2
(45) Date of Patent: Jul. 21, 2026

(54) USER EQUIPMENT (UE) CAPABILITY REPORTING IN ASSOCIATION WITH SIMULTANEOUS UPLINK TRANSMISSIONS USING MULTIPLE ANTENNA PANELS

(71) Applicant: Apple Inc., Cupertino, CA (US)

(72) Inventors: Haitong Sun, Saratoga, CA (US);
Chunxuan Ye, San Diego, CA (US);
Dawei Zhang, Saratoga, CA (US);
Hong He, San Jose, CA (US); Jie Cui,
San Jose, CA (US); Wei Zeng,
Saratoga, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 18/402,711

(22) Filed: Jan. 2, 2024

(65) Prior Publication Data

US 2024/0276353 A1     Aug. 15, 2024

Related U.S. Application Data

(60) Provisional application No. 63/445,240, filed on Feb. 13, 2023.

(51) Int. Cl.
| | |
|---|---|
| *H04W 48/16* | (2009.01) |
| *H04W 24/10* | (2009.01) |
| *H04W 28/02* | (2009.01) |

(52) U.S. Cl.
CPC ........... *H04W 48/16* (2013.01); *H04W 24/10* (2013.01); *H04W 28/0215* (2013.01)

(58) Field of Classification Search
CPC .. H04W 48/16; H04W 24/10; H04W 28/0215
See application file for complete search history.

(56) References Cited

U.S. PATENT DOCUMENTS

| | | | |
|---|---|---|---|
| 2020/0229175 A1* | 7/2020 | Li | ........................ H04W 72/543 |
| 2022/0353040 A1* | 11/2022 | Zhu | ........................ H04L 5/005 |

(Continued)

FOREIGN PATENT DOCUMENTS

| | | | | |
|---|---|---|---|---|
| CN | 116997021 A | * 11/2023 | .......... | H04W 72/121 |
| WO | 2022254088 A1 | 12/2022 | | |
| WO | WO-2024026682 A1 | * 2/2024 | ............ | H04W 28/06 |

OTHER PUBLICATIONS

"Discussion on Unified TCI Framework Extension for Multi-TRP", Vivo, 3GPP TSG RAN WG1 #110, R1-2206024 , Aug. 22-26, 2022 , 20 pages.

(Continued)

*Primary Examiner* — Kenny S Lin
(74) *Attorney, Agent, or Firm* — Kilpatrick Townsend & Stockton LLP

(57)     ABSTRACT

The present application relates to devices and components including apparatus, systems, and methods that support capability index reporting associated with multi-antenna panel uplink transmissions. In an example, a base station configures a UE to perform channel state information (CSI) group-based reporting. The UE can report a set of capability indexes that correspond to an antenna panel or for a plurality of antenna panels. This report can indicate the number of sounding reference signal (SRS) ports supported per corresponding antenna panel(s). Further, the reported capability indexes can be included in a CSI group-based report or in a standalone report.

20 Claims, 12 Drawing Sheets

(56) References Cited

U.S. PATENT DOCUMENTS

| | | | |
|---|---|---|---|
| 2023/0239897 A1* | 7/2023 | Zhu | H04L 5/0094 |
| | | | 370/329 |
| 2023/0247664 A1* | 8/2023 | Bai | H04B 7/0404 |
| 2023/0254854 A1* | 8/2023 | Cirik | H04L 1/189 |
| | | | 370/336 |
| 2024/0235652 A9* | 7/2024 | Hakola | H04B 7/06956 |
| 2025/0212283 A1* | 6/2025 | Matsumura | H04W 8/22 |
| 2025/0266880 A1* | 8/2025 | Karjalainen | H04B 7/0626 |

OTHER PUBLICATIONS

"Precoder Indication for Multi-Panel UL Transmission", Nokia, 3GPP TSG RAN WG1 #109-e, R1-2204543 , May 9-20, 2022 , 12 pages.

"Simultaneous Multi-Panel Transmission" , Qualcomm Incorporated, 3GPP TSG-RAN WG1 Meeting #110-bis-e-Meeting, R1-2209972 , Oct. 10-19, 2022 , 18 pages.

"UL Precoding Indication for Multi-Panel Transmission" Intel Corporation, 3GPP TSG RAN WG1 #111, R1-2211387 , Nov. 14-18, 2022 , 18 pages.

The International Application No. PCT/US2024/010062, "International Search Report and Written Opinion," mailed May 7, 2024, 17 pages.

International Patent Application PCT/US2024/010062, "International Preliminary Report on Patentability", Aug. 28, 2025, 12 pages.

* cited by examiner

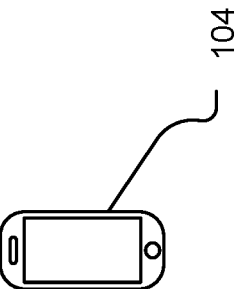
104
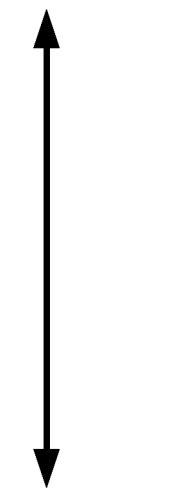
100
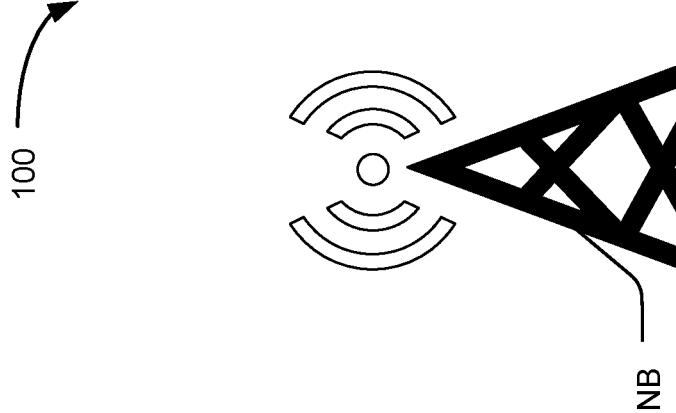
gNB
108
FIG. 1

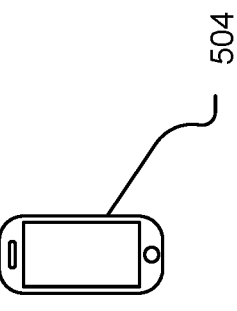
504
Capability Index Information 510
(Index #1: value (possibly larger than four);
...
Index #M: value (possibly larger than four))
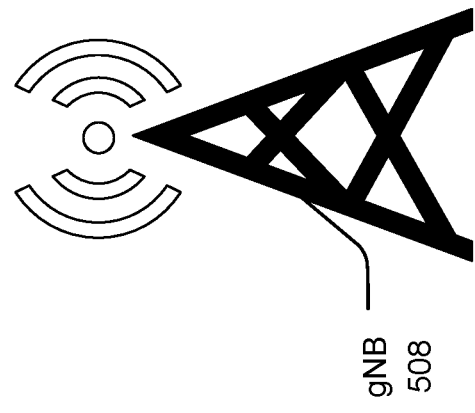
gNB
508
FIG. 5

Figure 8:
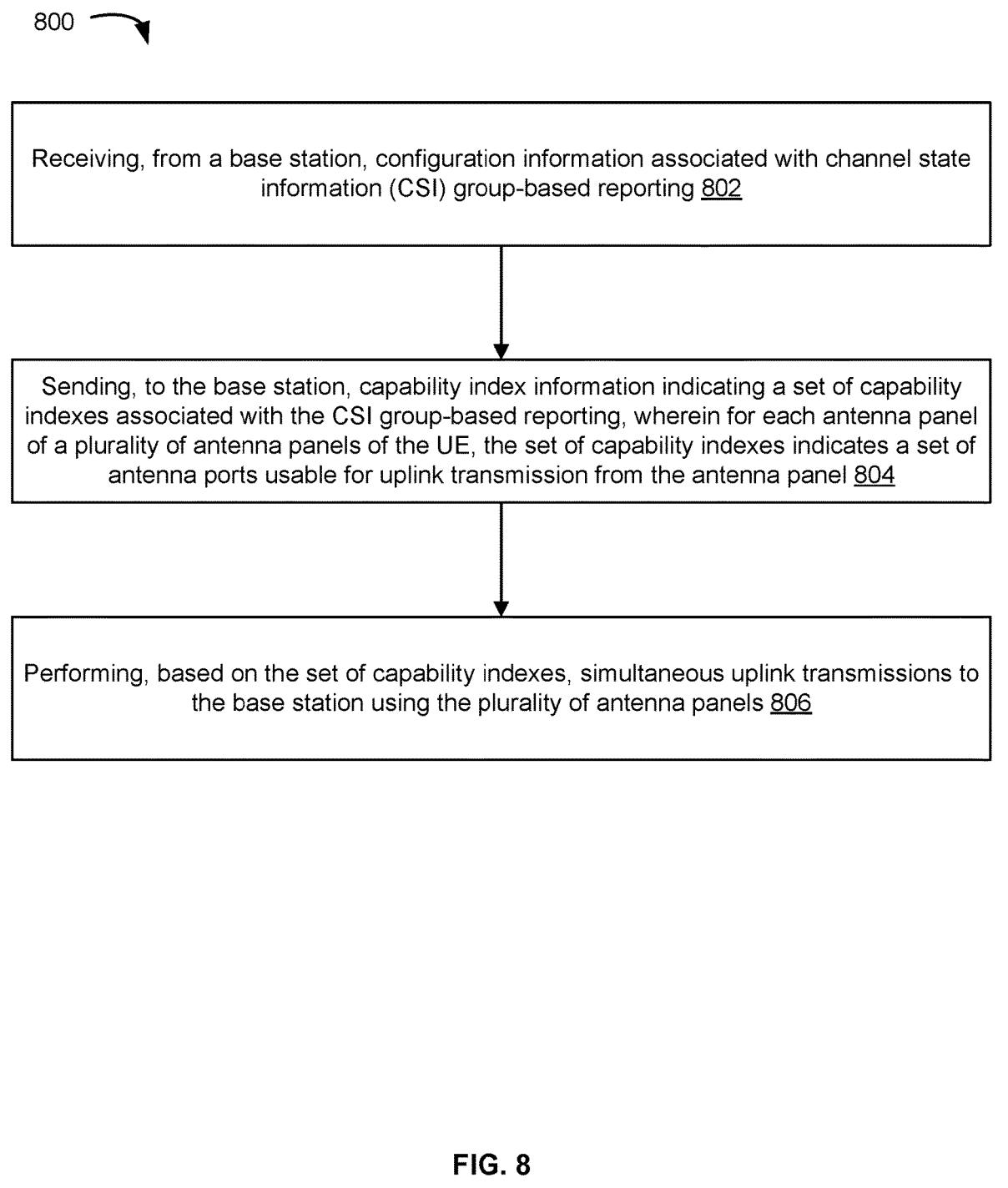

800

Receiving, from a base station, configuration information associated with channel state information (CSI) group-based reporting 802

Sending, to the base station, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel 804

Performing, based on the set of capability indexes, simultaneous uplink transmissions to the base station using the plurality of antenna panels 806

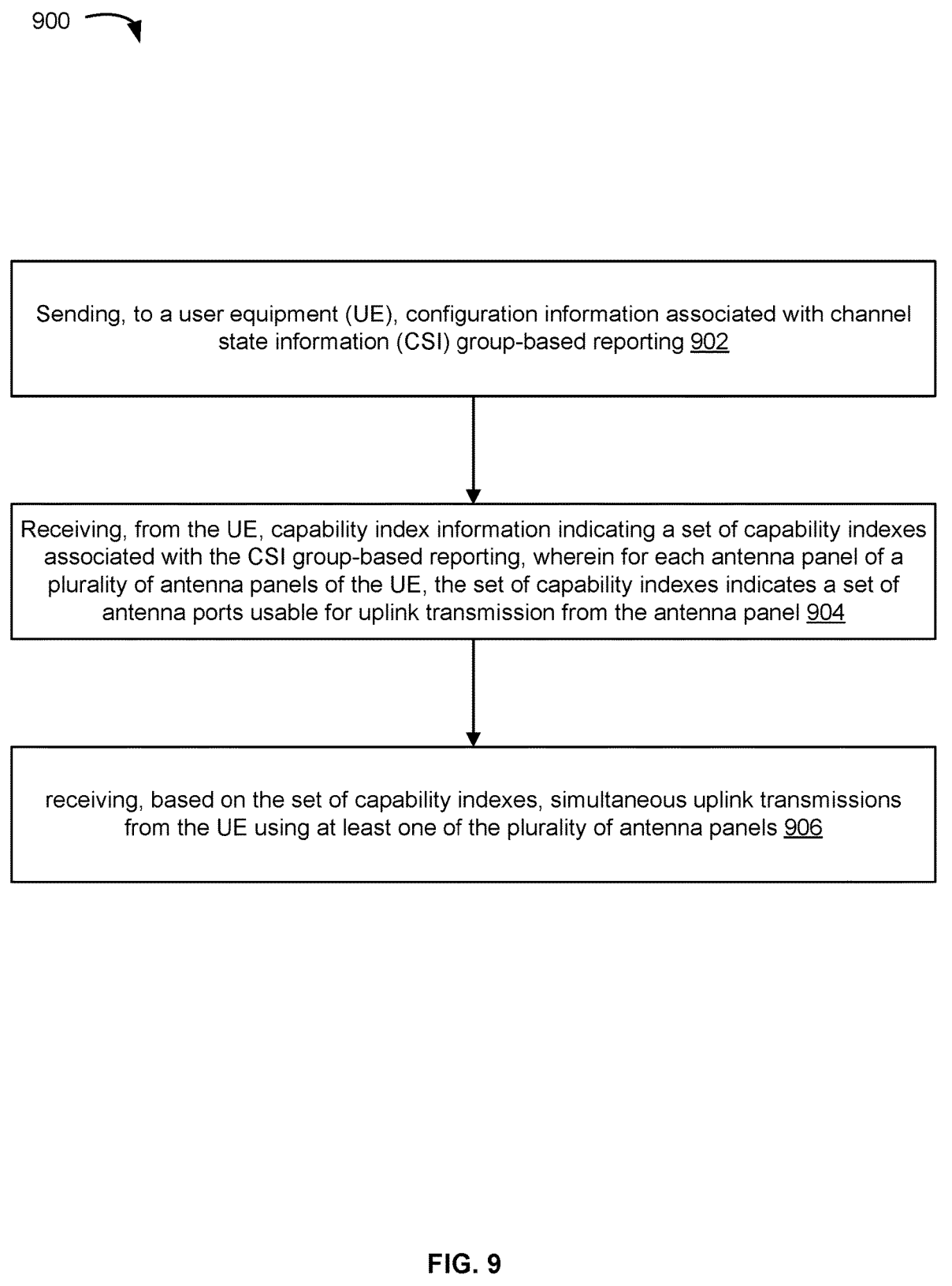

Sending, to a user equipment (UE), configuration information associated with channel state information (CSI) group-based reporting 902

Receiving, from the UE, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel 904 receiving, based on the set of capability indexes, simultaneous uplink transmissions from the UE using at least one of the plurality of antenna panels 906

FIG. 9

USER EQUIPMENT (UE) CAPABILITY REPORTING IN ASSOCIATION WITH SIMULTANEOUS UPLINK TRANSMISSIONS USING MULTIPLE ANTENNA PANELS

CROSS-REFERENCES TO RELATED APPLICATIONS

This application claims the benefit of U.S. Provisional Patent Application Ser. No. 63/445,240, filed Feb. 13, 2023, the entire disclosure of which is hereby incorporated in its entirety by reference for all purposes.

BACKGROUND

Cellular communications can be defined in various standards to enable communications between a user equipment and a cellular network. For example, Fifth generation mobile network (5G) is a wireless standard that aims to improve upon data transmission speed, reliability, availability, and more.

BRIEF DESCRIPTION OF THE DRAWINGS

FIG. 1 illustrates an example of a network environment, in accordance with some embodiments.

FIG. 5 illustrates an example of capability index information that can be reported as part of a UE capability, in accordance with some embodiments.

FIG. 8 illustrates an example of an operational flow/ algorithmic structure for a UE to, at least in part, report its capability associated with simultaneous uplink transmissions, in accordance with some embodiments.

FIG. 9 illustrates example of an operational flow/algorithmic structure for a base station to, at least in part, receive UE capability associated with simultaneous uplink transmissions, in accordance with some embodiments.

DETAILED DESCRIPTION

Figure 2:
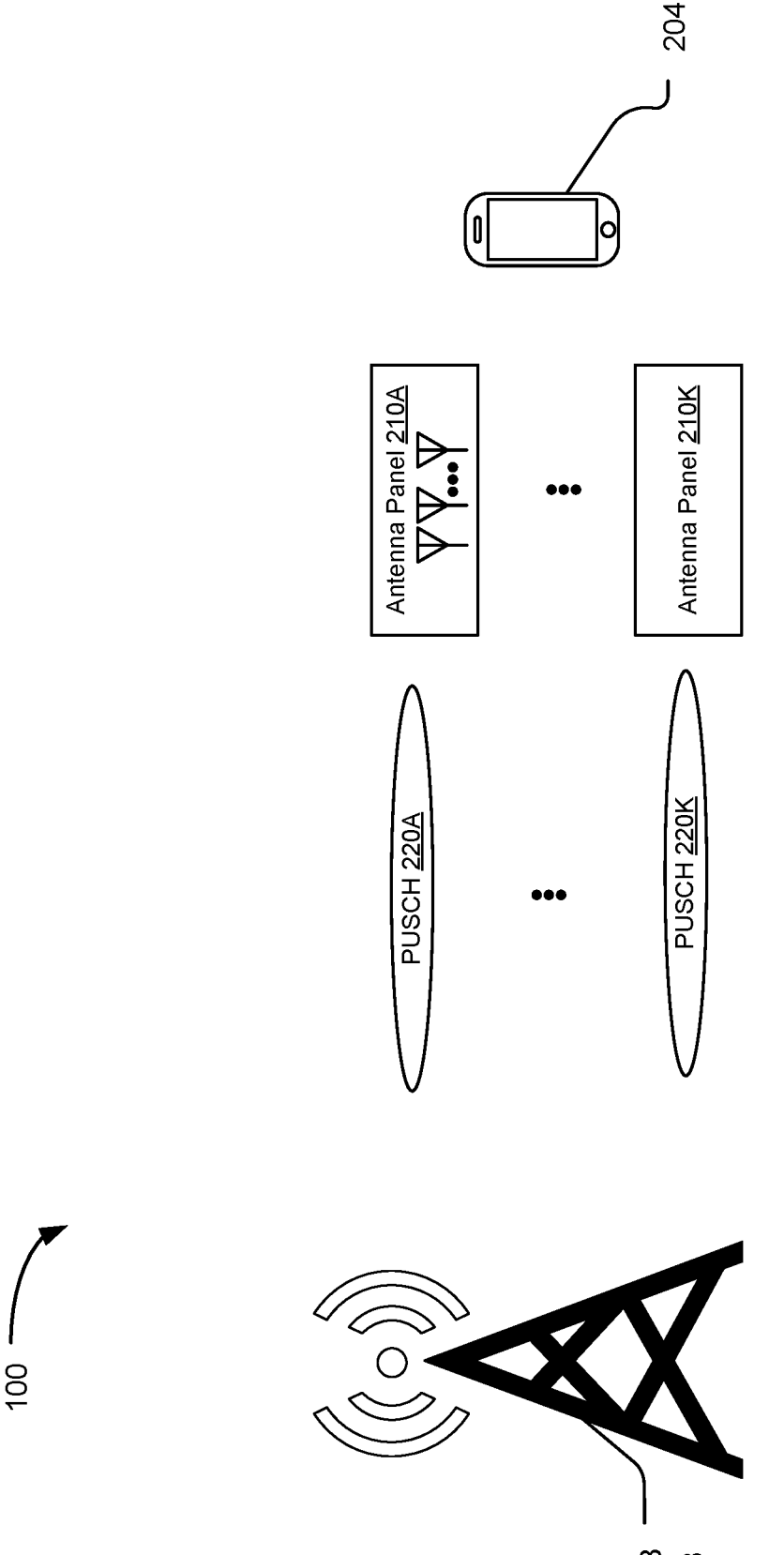
FIG. 2 illustrates an example of simultaneous uplink transmissions by a user equipment (UE), in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can include multiple antenna panels (e.g., two antenna panels) and can be configured to perform simultaneous uplink communications using the antenna panels. For example, a first antenna panel is used for a first physical uplink shared channel (PUSCH) transmission, whereas a second antenna panel is user for a second PUSCH transmission that is simultaneous with the first PUSCH transmission. To do so, the UE can report capability information to a base station. The capability information can indicate the number of ports (e.g., sounding reference signal (SRS) ports) that the UE supports per antenna panel. For example, the capability information can include one or more capability indexes that correspond to the first antenna panel, and each indicating the number of SRS ports. The same or different one or more capability indexes corresponding to the second antenna panel can also be included in the capability information. The UE can report the capability information in a channel state information (CSI) group-based report (e.g., a CSI report for a configured group of CSI resources) and/or in a standalone report. Further, a reported capability index can correspond to a value from a plurality of possible values. The value can indicate whether an antenna panel is activated or deactivated. The number of possible values can be larger than four. The number of possible capability indexes can also be larger than four. These and other features related to reporting the capability information are further described herein below.

The following is a glossary of terms that may be used in this disclosure.

The term "circuitry" as used herein refers to, is part of, or includes hardware components such as an electronic circuit, a logic circuit, a processor(shared, dedicated, or group) or memory(shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term"circuitry" may also refer to a combination of one or more hardware elements(or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments.

The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band, frequency range 2 (FR2) band, and/or high frequency range (FRH) band. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

Although not illustrated in FIG. 1, the network environment 100 may further include a base station with which the UE 104 may also connect. The base station can support the same RAT as the gNB 108 (e.g., the base station 112 is also a gNB). Additionally, or alternatively, the base station 112 can support a different RAT (e.g., Long-Term Evolution (LTE) eNB).

In an example, the UE 104 supports carrier aggregation (CA), whereby the UE 104 can connect and exchange data simultaneously over multiple component carriers (CCs) with the gNB 108 and/or the base station. The CCs can belong to the same frequency band, in which case they are referred to as intra-band CCs. Intra-band CCs can be contiguous or non-contiguous. The CCs can also belong to different frequency bands, in which case they are referred to as inter-band CCs. A serving cell can be configured for the UE 104 to use a CC. A serving cell can be a primary (PCell), a primary secondary cell (PSCell), or a secondary cell (SCell). Multiple SCells can be activated via an SCell activation procedures where the component carriers of these serving cells can be intra-band contiguous, intra-band noon-contiguous, or inter-band. The serving cells can be collocated or non-collocated.

The UE 104 can also support dual connectivity (DC), where it can simultaneously transmit and receive data on multiple CCs from two serving nodes or cell groups (a master node (MN) and a secondary node (SN)). DC capability can be used with two serving nodes operating in the same RAT or in different RATs (e.g., an MN operating in NR, while an SN operates in LTE). These different DC modes include, for instance, evolved-universal terrestrial radio access-new radio (EN)-DC, NR-DC, and NE-DC (the MN is a NR gNB and the SN is an LTE eNB).

FIG. 2 illustrates an example of simultaneous uplink transmissions by a UE 204 (e.g., an example of the UE 104 of FIG. 1), in accordance with some embodiments. The UE 204 includes multiple antenna panels 210A through 210K, where "K" is a positive integer equal to or larger than two. In an example, the antenna panels 210-210K are usable for simultaneous uplink transmissions to one or more base stations. In FIG. 2, a single base station, shown as gNB 208 (e.g., an example of the gNB 108 of FIG. 1) is illustrated, although a different number of base stations is possible. For instance, the uplink transmissions are on "K" PUSCH 220A through 220K to the gNB 208, and K" is two. This illustration corresponds to the capability of the UE 204 for two simultaneous PUSCH transmissions to the gNB 208.

In an example, the use of multiple antenna panels 210A-210K can be specific to a frequency range (e.g., FR2). Each antenna panel can include a plurality of antenna elements that can be controlled for beamforming. Further, the simultaneous PUSCH transmissions can use different multiplexing techniques, such as spatial domain multiplexing (SDM) including single frequency network (SFN) multiplexing, or such as frequency domain multiplexing (FDM).

The UE 204 can report multiple capability sets to the gNB 208 (or, more generally, a base station). Each capability set includes a maximum number of sounding reference signal (SRS) ports among possible choices. The capability set can be indicated using a capability index. It is desired to allow the flexibility of reporting different capability sets (e.g., capability indexes) for the different antenna panels. In this way, the UE 204 can be configured with different types of antenna panels.

Furthermore, the UE 204 can be configured for CSI group-based reporting. The CSI group-based reporting assumes that the UE 204 can transmit (and/or receive) with two beams (having a quasi co-location (QCL) type D association) simultaneously at any given time. As such, it is also desired to enable the UE to report the different capability sets in not only CSI non group-based reporting, but also in CSI group-based reporting.

Figure 3:
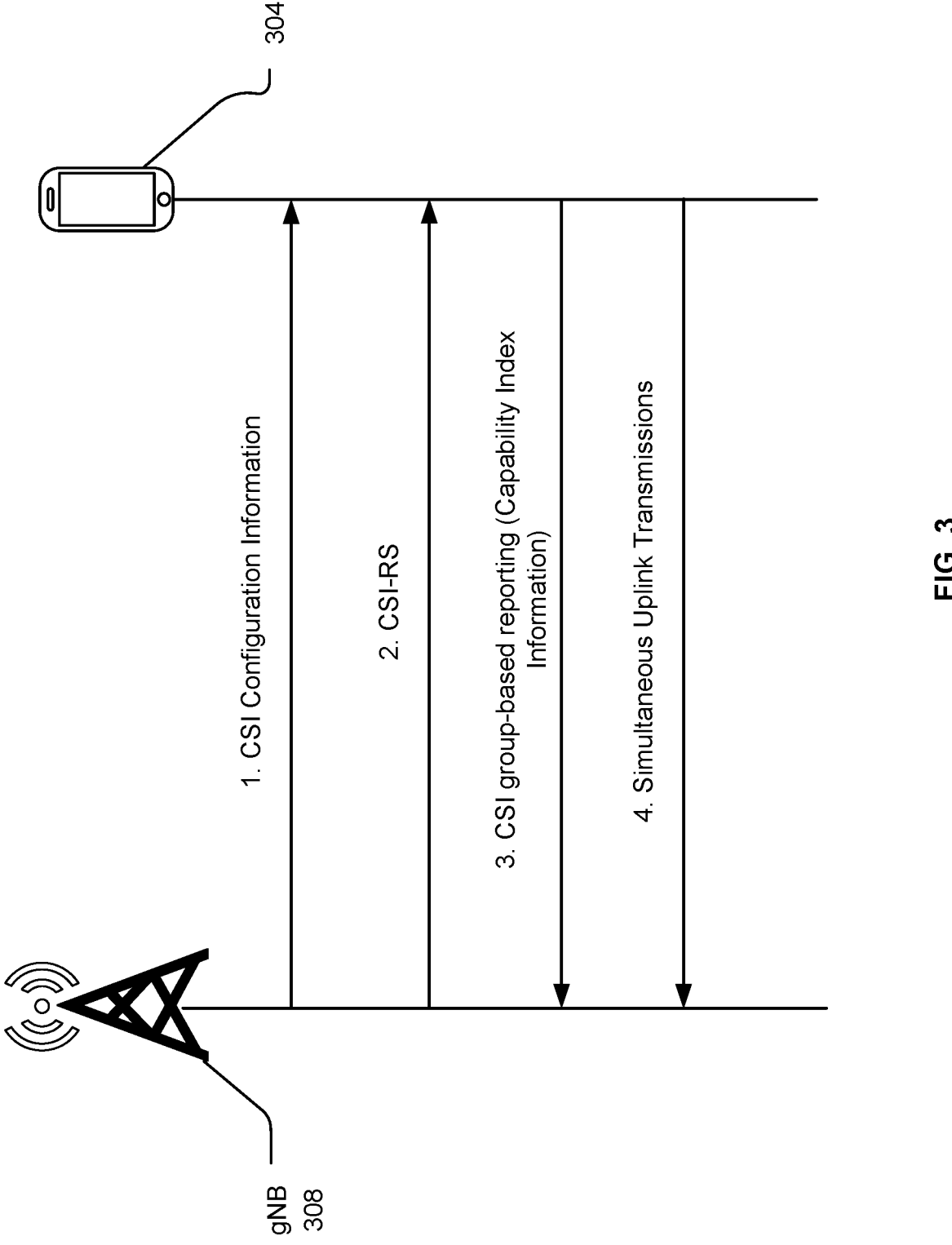
FIG. 3 illustrates an example of UE capability reporting in association with simultaneous uplink transmissions, in accordance with some embodiments.

FIG. 3 illustrates an example of UE capability reporting in association with simultaneous uplink transmissions, in accordance with some embodiments. The UE capability reporting can include capability index information indicating a set of capability indexes. The set can correspond to a plurality of antenna panels of a UE 304 (e.g., an example of the UE 204 of FIG. 2) or can include different sets (e.g., sub-sets) each corresponding to one of the plurality of antenna panels. For each antenna panel of the plurality of antenna panels of the UE 304, the set of capability indexes indicates a set of antenna ports usable for uplink transmission from the antenna panel. In the illustration of FIG. 3, the UE capability reporting is associated with CSI group-based reporting, where the capability index information can be included in a CSI-group based report.

In an example, a gNB 308 (e.g., an example of the gNB 208 of FIG. 2) configures the UE 304 for CSI group-based reporting. For example, the gNB 208 sends CSI configuration information that includes a plurality of information elements (IEs) related to CSI components (e.g., channel quality information (CQI), precoding matrix indicator (PMI), CSI-RS resource indicator (CRI), SS/PBCH resource block indicator (SSBRI), layer indicator (LI), rank indicator (RI), L1-reference signal received power (L1-RSRP), and/or L1-signal to interference and noise ratio (L1-SINR)). The CSI configuration information can indicate, among other things, resources (e.g., a ResourceSet) that belong to a specific group to be used, a type of reference signals (e.g., CSI ResourceConfig), and/or which type of reference signals is to be used for measurements (e.g., CSI ReportConfig). Other information can also be provided to the UE 304, such as report type configurations (e.g., periodic, semi-persistent, or aperiodic) and the like.

Once configured, the gNB 308 can send CSI reference signals (CSI-RSs) to the UE 304 such that the UE 304 can perform the relevant measurements and send a CSI report. In an example, the UE 304 is configured for CSI group-based reporting and, as such, sends a CSI group-based report based on the measurements of the CSI-RSs. Example fields that can be included in the CSI group-based report is described in Table 6.3.1.1.2-8B of 3GPP TS 38.212 V17.4.0 (2023 January), which is incorporated herein by reference in its entirety.

In an example, the UE 304 can also include its capability index information in the CSI group-based report. For example, additional fields are included in the CSI-group based report. In these fields, capability indexes (e.g., more than one CapabilityIndex) can be reported, each corresponding to one respective antenna panel of the UE 304 (e.g., a first CapabilityIndex for antenna panel 210A and a $K^{th}$ CapabilityIndex for antenna panel 210K). An example of such fields is shown in Table 1 below and can be defined as additional entries to Table 6.3.1.1.2-8B.

TABLE 1

| CSI Report Number | CSI fields |
|---|---|
| CSI report #n | CapabilityIndex #1 of 1st resource group as in Table 6.3.1.1.2-6, if reported |
| | CapabilityIndex #2 of 1st resource group as in Table 6.3.1.1.2-6, if reported |
| | CapabilityIndex #1 of 2nd resource group as in Table 6.3.1.1.2-6, if reported |
| | CapabilityIndex #2 of 2nd resource group as in Table 6.3.1.1.2-6, if reported |
| | CapabilityIndex #1 of 3rd resource group as in Table 6.3.1.1.2-6, if reported |
| | CapabilityIndex #2 of 3rd resource group as in Table 6.3.1.1.2-6, if reported |
| | CapabilityIndex #1 of 4th resource group as in Table 6.3.1.1.2-6, if reported |
| | CapabilityIndex #2 of 4th resource group as in Table 6.3.1.1.2-6, if reported |

In Table 1, a resource group corresponds a set of CSI resources that can be transmitted on a beam, where this beam corresponds to an antenna panel. The associated "CapabilityIndex" can correspond to the antenna panel and can be two bits and indicate a value from possible values. The value can be from a set of {1, 2, 4} (e.g., a value of "4" indicates up to four SRS ports are supported for PUSCH uplink transmission using the corresponding antenna panel.). However, a further described elsewhere in the present disclosure, other values are possible (e.g., a value of "0" indicating that the corresponding antenna panel is deactivated) and/or a larger set of values is possible (e.g., {0, 1, 2, 4, 6, 8} or {1, 2, 4, 6, 8}) depending on the type of the corresponding antenna panel.

To illustrate, the UE 304 can report "CapabilityIndex #1 of 1st resource group" and "CapabilityIndex #2 of 1st resource group." "CapabilityIndex #1" corresponds to a first antenna panel, whereas "CapabilityIndex #2" correspond to a second antenna panel. The two capability indexes can indicate two different values.

In another example, the fields in the CSI group-based report can include a single capability index (e.g., one CapabilityIndex) corresponding to the different antenna panels of the UE 304 (e.g., a single CapabilityIndex for antenna panels 210A-210K). An example of such fields is shown in Table 2 below and can be defined as additional entries to Table 6.3.1.1.2-8B.

TABLE 2

| CSI Report Number | CSI fields |
|---|---|
| CSI report #n | CapabilityIndex #1 of 1st resource group as in Table 6.3.1.1.2-6, if reported |
| | CapabilityIndex #2 of 2nd resource group as in Table 6.3.1.1.2-6, if reported |
| | CapabilityIndex #3 of 3rd resource group as in Table 6.3.1.1.2-6, if reported |
| | CapabilityIndex #4 of 4th resource group as in Table 6.3.1.1.2-6, if reported |

To illustrate, the UE 304 can report "CapabilityIndex #1 of 1st resource group." "CapabilityIndex #1" correspond to the first antenna panel and the second antenna panel.

As further illustrated in FIG. 3, the UE 304 can also perform simultaneous uplink transmissions using the antenna panels (e.g., simultaneous PUSCH transmissions). The CSI group-based report can be transmitted on one or multiple ones of the simultaneous PUSCH (e.g., in the case of aperiodic reporting) or on PUSCH or PUCCH (e.g., in other cases). In an example, the gNB 308 can indicate the channels to use for the simultaneous uplink transmissions based on the CSI group-based report (e.g., in situations where reciprocity is assumed between downlink channels on which the CSI-RSs were sent and uplink channels).

Figure 4:
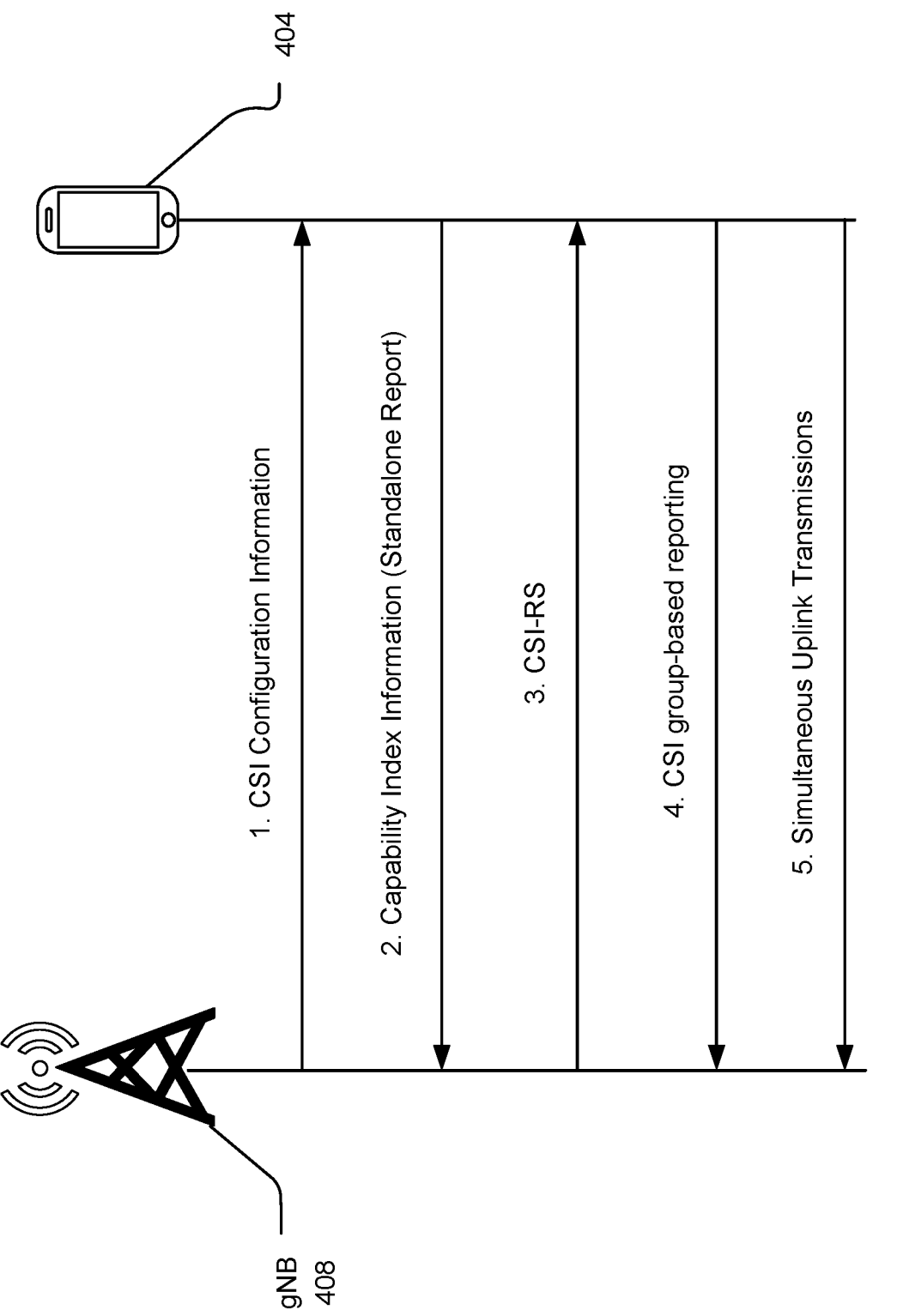
FIG. 4 illustrates another example of UE capability reporting in association with simultaneous uplink transmissions, in accordance with some embodiments.

FIG. 4 illustrates another example of UE capability reporting in association with simultaneous uplink transmissions, in accordance with some embodiments. Here also, the UE capability reporting can include capability index information indicating a set of capability indexes. The set can correspond to a plurality of antenna panels of a UE 404 (e.g., an example of the UE 204 of FIG. 2) or can include different sets (e.g., sub-sets) each corresponding to one of the plurality of antenna panels. For each antenna panel of the plurality of antenna panels of the UE 404, the set of capability indexes indicates a set of antenna ports usable for uplink transmission from the antenna panel. Unlike the illustration of FIG. 3, the UE capability reporting is sent to a gNB 407 (e.g., an example of the gNB 208 of FIG. 2) as a standalone report that is separate from a CSI group-based report. In this case, the CSI group-based report (if sent) need not (but may also) include the capability index information. Further, the standalone report can also be sent even when the UE 404 is not configured for CSI group-based reporting.

In an example, the gNB 408 (e.g., an example of the gNB 208 of FIG. 2) configures the UE 404 for CSI reporting (possibly for CSI group-based reporting). For example, the gNB 208 sends CSI configuration information that includes a plurality of information elements (IEs) related to CSI components (e.g., CQI, PMI, CRI, SSBRI, L1-RSRP, L1-SINR, etc.). The CSI configuration information can indicate, among other things, resources (e.g., a ResourceSet) that belong to a specific group to be used, a type of reference signals (e.g., CSI ResourceConfig), and/or which type of reference signals is to be used for measurements (e.g., CSI ReportConfig). Other information can also be provided to the UE 404, such as report type configurations (e.g., periodic, semi-persistent, or aperiodic) and the like.

Before or after CSI reference signals are sent to the UE 404 or before or after the UE 404 sends a CSI report (e.g., a CSI group-based report), the UE can send capability index information in a standalone report to the gNB 408. This standalone report can include non-CSI metrics (e.g., can exclude CSI group-based report metrics and/or other types of CSI report metrics). For example, the standalone report excludes L1-RSRP and/or L1-SINR measurements. Instead, the standalone report includes other information such as a transmission configuration indication (TCI) state identifier, an SRS resource set identifier, etc.

In an example, the gNB 408 indicates (e.g., via RRC signaling) a plurality of TCI states to the UE 404 for uplink transmissions and/or activates a subset of the plurality of TCI states (e.g., via a medium access control (MAC) control element (CE) or DCI) for the UE 404. The antenna panels can be logically mapped to such TCI states. For instance, when two joint uplink TCI states are indicated for simultaneous uplink transmissions, each indicated TCI state can represent a panel logically and map to a reported CapabilityIndex (which is included in the standalone report). Additionally or alternatively, when two joint uplink TCI states are activated for simultaneous uplink transmissions, each activated TCI state can represent a panel logically and map to a reported CapabilityIndex (which is included in the standalone report).

In another example, the gNB 408 (or more generally, the network) configures SRS resource sets (e.g., SRS-Resource-Set) for the UE 404 (e.g., via RRC signaling). The SRS resource sets can be configured for codebook and/or non-codebook PUSCH operations. The antenna panels can be logically mapped to such SRS resource sets. For instance, when two SRS resource sets (e.g., two of SRS-ResourceSet) are configured for codebook PUSCH operations, each configured SRS resource set can represent a panel logically and map to a reported CapabilityIndex (which is included in the standalone report). Additionally or alternatively, when two SRS resource sets (e.g., two of SRS-ResourceSet) are configured for non-codebook PUSCH operations, each configured SRS resource set can represent a panel logically and map to a reported CapabilityIndex (which is included in the standalone report).

In yet another example, the gNB 408 (or more generally, the network) configures a plurality of control resource set (e.g., CORESET) groups or pool indexes for the UE 404 (e.g., via RRC signaling). The antenna panels can be logically mapped to such CORESET groups or pool indexes. For instance, when two CORSET groups or pool indexes are configured, each configured CORSET group or pool index can represent a panel logically and map to a reported CapabilityIndex (which is included in the standalone report).

Based on the CSI configuration, the gNB 408 can send CSI-RSs to the UE 404 such that the UE 404 can perform the relevant measurements and send a CSI report. In an example, the UE 404 is configured for CSI group-based reporting and, as such, sends a CSI group-based report based on the measurements of the CSI-RSs.

As further illustrated in FIG. 4, the UE 404 can also perform simultaneous uplink transmissions using the antenna panels (e.g., simultaneous PUSCH transmissions). The CSI report can be transmitted on one or multiple ones of the simultaneous PUSCH (e.g., in the case of aperiodic reporting) or on PUSCH or PUCCH (e.g., in other cases). In an example, the gNB 408 can indicate the channels to use for the simultaneous uplink transmissions based on the CSI report (e.g., in situations where reciprocity is assumed between downlink channels on which the CSI-RSs were sent and uplink channels).

In an example, the CSI configuration information sent by the gNB 408 (e.g., the CSI-ReportConfig) configures the UE 404 to report multiple CapabilityIndex'es. Such information includes a plurality of information elements. A portion of the information elements relate to the CSI report that the UE 404 would send. This portion may be ignored by the UE 404 for the purpose of the standalone report. Another portion of the information elements can be specific to the standalone report and, as such, can configure the UE to generate and send the standalone report. These information elements can include an indicator of the standalone report (e.g., a reportConfigId), an indicator of a serving cell for which the standalone report is valid (e.g., a cell ID or any other information that indicate a carrier), a type of the standalone report (e.g., reportConfigType indicating whether the standalone report is a periodic, semi-persistent, or aperiodic report; this reportConfigType can be common to the CSI report), and a value for reporting a capability index (e.g., reportQuantity which can be a value introduced for reporting an index, such as a CapabilityIndex).

In an example, the UE 404 can initiate the standalone report to the gNB 408 on its own. For example, the UE 404 can generate and send the standalone report without being triggered or requested by the gNB 408 and/or without an existing uplink grant that the gNB 408 already provided to the UE 404 for the purpose of the standalone report or other purposes. Additionally, or alternatively, a non-standalone report that includes the capability index information (e.g., a CSI group-based report as in FIG. 3) can be initiated by the UE 404 on its own.

When a capability index report including the capability index information (e.g., a standalone report or a non-standalone report) can be initiated by the UE 404, the UE 404 can initiate this report under one or more conditions. Generally, the conditions can relate to the availability or quality of uplink transmissions. When one or more of such conditions are met, the UE 404 can generate the capability index report. For example, a first condition can be when the network (e.g., the gNB 408) activates and/or indicates a new TCI state for uplink transmission. A second condition can be when the network (e.g., the gNB 408) reconfigures an SRS resource set (e.g., SRS-ResourceSet) for uplink transmission. A third condition can be when a power headroom (PHR) change exceeds a threshold. A fourth condition can be a power management maximum power reduction (P-MPR) change exceeding a threshold. When any or a combination of such four conditions is met, the capability index report can be initiated.

When a capability index report including the capability index information (e.g., a standalone report or a non-standalone report) can be initiated by the UE 404, the UE 404 can initiate this report using one or more method. For example, a first method includes initiating a physical random access channel (PRACH) transmission. This PRACH transmission can be a contention based random access (CBRA) transmission and/or a contention free random access (CFRA) transmission. A second method includes initiating a scheduling request (SR) transmission. A third example method includes using an existing uplink grant (e.g., an uplink grant provided by the gNB 408 for the UE 404 for any purpose, as long as the uplink grant provides sufficient resources for the transmission of the capability index report).

Different mechanisms are possible to send a capability index report that includes the capability index information. For example, a capability index (e.g., CapabilityIndex) can be reported via UCI over PUCCH and/or PUSCH. Additionally, or alternatively, a capability index (e.g., CapabilityIndex) can be reported via a MAC CE. Additionally, or alternatively, a capability index (e.g., CapabilityIndex) can be reported via RRC. In an example, the capability index is two bits. The values of these two bits are set in the UCI, the MAC CE, and/or UE assistance information (UAI) signaled via RRC.

As such, it may be possible to send a standalone report that includes capability index information via UCI. This standalone report may exclude and may not be reported with CSI report related metrics such as L1-RSRP and/or L1-SINR. In terms of CSI priority, a reported capability index can have the same priority as L1-RSRP and/or L1-SINR report, a higher priority than L1-RSRP and/or L1-SINR report, or a lower priority than L1-RSRP and/or L1-SINR report. The capability index's priority (or relative priority to a CSI report metric(s) such as L1-RSRP and/or L1-SINR) can be predefined in a technical specification or can be configured by the gNB 408 (e.g., via RRC signaling).

FIG. 5 illustrates an example of capability index information 510 that can be reported as part of a UE capability, in accordance with some embodiments. This reporting can be included in a standalone report (e.g., as in FIG. 4) or a non-standalone report (e.g., as in FIG. 3).

In an example, a UE 504 (e.g., an example of the UE 204 of FIG. 2) includes multiple antenna panels that can be used for simultaneous uplink transmissions to a gNB 508 (e.g., an example of the gNB 208 of FIG. 2). The capability index information 510 can indicate a set of values, where each value corresponds to one capability index from a set of capability indexes. The size of the set of values (e.g., the number of reported capability indexes) is illustrated to be "M" in FIG. 5, where "M" is a positive integer that may be different than "K" (the number of antenna elements). For example, for "CapabilityIndex #1," a first value can be indicated. Similarly, for "CapabilityIndex #M," an $M^{th}$ value can be indicated. In an example, "M" is larger than four such as six or eight. In other words, the maximum number of CapabilityIndex'es can be extended to be larger than four, such as to be six or eight.

Additionally (e.g., with "M" being larger than four), or alternatively (e.g., with "M" being equal to or smaller than four), the reported values can, but need not, be different. Each value can be from a configured set of values. In certain situations, the configured value set has more than three possible values (e.g., an additional value other than "1," "2," or "4"). The largest possible value of the set of possible value can be larger than four, such as by being equal to six or eight (e.g., indicating a maximum number of six or eight SRS ports).

Figure 6:
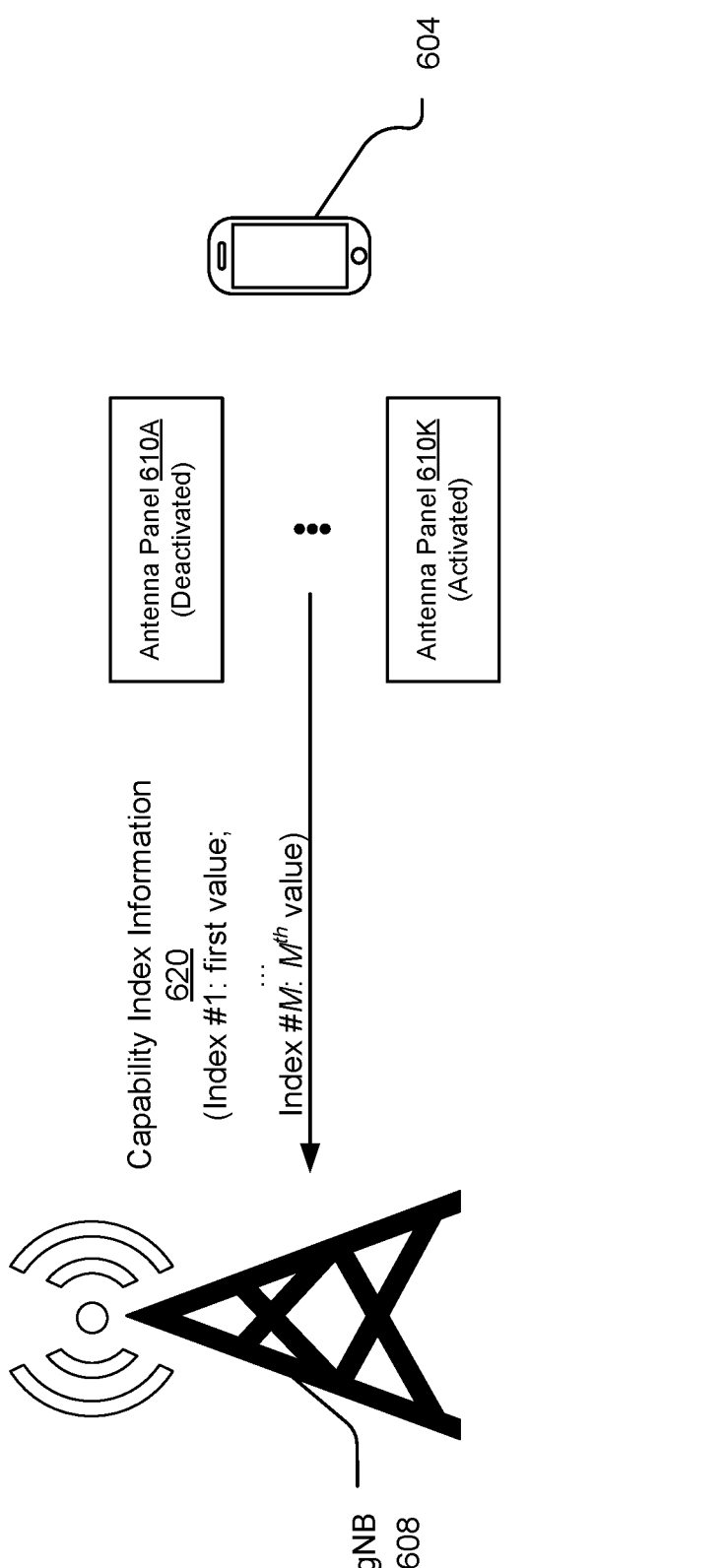
FIG. 6 illustrates another example of capability index information that can be reported as part of a UE capability, in accordance with some embodiments.

FIG. 6 illustrates another example of capability index information 620 that can be reported as part of a UE capability, in accordance with some embodiments. This reporting can be included in a standalone report (e.g., as in FIG. 4) or a non-standalone report (e.g., as in FIG. 3).

As illustrated, a UE 604 (e.g., an example of the UE 204 of FIG. 2) includes multiple antenna panels 610A through 610K that can be used for simultaneous uplink transmissions to a gNB 608 (e.g., an example of the gNB 208 of FIG. 2). The capability index information 620 can indicate a set of values, where each value corresponds to one capability index from a set of capability indexes. The size of the set of values (e.g., the number of reported capability indexes) is illustrated to be "M" in FIG. 6, where "M" is a positive integer that may be different than "K" (the number of antenna elements). For example, for "CapabilityIndex #1," a first value can be indicated. Similarly, for "CapabilityIndex #M," a $M^{th}$ value can be indicated. The reported values can, but need not, be different. Each value can be from a configured set of values.

In certain situations, one of the antenna panels (say the antenna panel 610A) is deactivated. A corresponding capability index (say "CapabilityIndex #1") is reported and corresponds to this deactivated antenna panel. The value of this capability index can be from a set of possible values and can indicate that the antenna panel is deactivated. For example, this set of possible values includes the value "0," and this value is reported to indicate the deactivation.

In the case of two antenna panels (e.g., "K" is equal to "2"), when the capability index reported for one of the two antenna panels indicates that this antenna panel is deactivated (e.g., the value of "0"), the UE 504 can be restricted from reporting a capability index for the other antenna panels indicating that this antenna panel is also deactivated. In other words, say that antenna panel 610A is deactivated. The reported capability index for this antenna panel 610A can be set to be the "0" value. However, the reported capability index for the other antenna panel 610K cannot be set to be the "0" value because the antenna panel 610K cannot be simultaneously deactivated. As such, the UE 504 cannot report the "0" value for both capability indexes corresponding to the two antenna panels. This restriction on the "0" value (or the "deactivated indication" value) can be generalized to more than two antenna panels. For example, for "K" antenna panels (where "K" is larger than "2"), the "0" value can be set for multiple capability indexes as long as "K–1" or a smaller number of antenna panels are deactivated.

Figure 7:
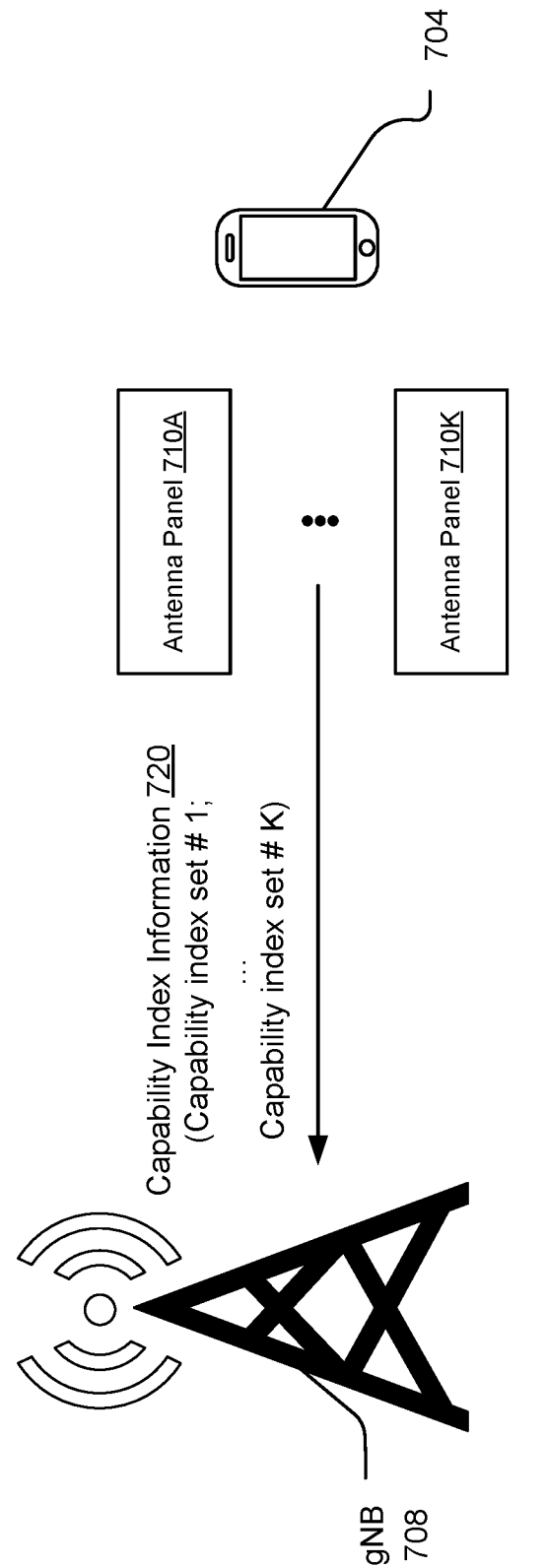
FIG. 7 illustrates another example of capability index information that can be reported as part of a UE capability, in accordance with some embodiments.

FIG. 7 illustrates another example of capability index information 720 that can be reported as part of a UE capability, in accordance with some embodiments. This reporting can be included in a standalone report (e.g., as in FIG. 4) or a non-standalone report (e.g., as in FIG. 3).

As illustrated, a UE 704 (e.g., an example of the UE 204 of FIG. 2) includes multiple antenna panels 710A through 710K that can be used for simultaneous uplink transmissions to a gNB 708 (e.g., an example of the gNB 208 of FIG. 2). The capability index information 720 can include one or more capability index set. In turn, each capability index set can include one or more capability indexes.

In an example, more than one capability index set is included in the capability index information 720. In this example, each capability index set can represent a list of capability indexes that correspond to one antenna element. In other words, for "K" antenna panels, a first capability index set represents a first list of one or more capability indexes corresponding to the first antenna panel 710A and include one or more capability indexes, and so on until a $K^{th}$ capability index set. The $K^{th}$ capability index set represents a $K^{th}$ list of one or more capability indexes corresponding to the $K^{th}$ antenna panel 710K include one or more capability indexes. As such, the UE 704 can report K srs-PortReport's. Each srs-PortReport can include a different number of entries and/or each entry can be reported with a different value.

In another example, one capability index set is included in the capability index information 720. This capability index set represents a list of one or more capability indexes and corresponds to the antenna panels 710A-710K. As such, the UE 704 can report only one list of CapabilityIndex'es. And this same list is assumed for all of the UE's 704 antenna panels.

In the case where "K" is larger than two (e.g., the UE 704 includes three, four, or a larger number of antenna panels), a hybrid approach can be used. In particular, the antenna panels can be logically grouped in subsets. A list of capability indexes can be reported for each subset of the antenna panels.

Referring back to FIGS. 5-7, the possible values and possible set of capability indexes can be configured by a base station (e.g., via RRC signaling) as part of an SRS port configuration. An example of this configuration is as follows:

```
srs-PortReport-r18 SEQUENCE {
capVal1-r18 ENUMERATED {n0, n1, n2, n4, n6, n8} OPTIONAL,
capVal2-r18 ENUMERATED {n0, n1, n2, n4, n6, n8} OPTIONAL,
capVal3-r18 ENUMERATED {n0, n1, n2, n4, n6, n8} OPTIONAL,
capVal4-r18 ENUMERATED {n0, n1, n2, n4, n6, n8} OPTIONAL,
capVal5-r18 ENUMERATED {n0, n1, n2, n4, n6, n8} OPTIONAL,
capVal6-r18 ENUMERATED {n0, n1, n2, n4, n6, n8} OPTIONAL,
}
```

In the above example, "capVal1-r18" corresponds to a first CapabilityIndex. The maximum number CapabilityIndex'es is six (ending in "capVal6-r18"). Each one of the reported CapabilityIndex can be set to a value from a set of {0, 1, 2, 4, 6, 8}. A "0" value can indicate that the corresponding antenna panel is deactivated. In comparison, the maximum value of eight can indicate that transmission using the antenna panel can support a maximum of eight SRS ports.

FIG. 8 illustrates an example of an operational flow/ algorithmic structure 800 for a UE to, at least in part, report its capability associated with simultaneous uplink transmissions, in accordance with some embodiments. The UE is an example of any of the UEs described in the present disclosure. The operational flow/algorithmic structure 800 can be performed by the UE as a whole and/or by particular components thereof.

In an example, the operational flow/algorithmic structure 800 includes, at 802, receiving, from a base station, configuration information associated with channel state information (CSI) group-based reporting. For example, the UE receives CSI configuration information that includes a plurality of IEs related to CSI components (e.g., CQI, PMI, CRI, SSBRI, L1-RSRP, L1-SINR, etc.). The CSI configuration information can indicate, among other things, resources (e.g., a ResourceSet) that belong to a specific group to be used, a type of reference signals (e.g., CSI ResourceConfig), and/or which type of reference signals is to be used for measurements (e.g., CSI ReportConfig). Other information can also be provided to the UE 404, such as report type configurations (e.g., periodic, semi-persistent, or aperiodic) and the like. For a standalone capability index report, the CSI configuration information can also include an indicator of the standalone report (e.g., a reportConfigId), an indicator of a serving cell for which the standalone report is valid (e.g., a cell ID or any other information that indicate a carrier), a type of the standalone report (e.g., reportConfigType indicating whether the standalone report is a periodic, semi-persistent, or aperiodic report; this reportConfigType can be common to the CSI report), and a value for reporting a capability index (e.g., reportQuantity which can be a value introduced for reporting an index, such as a CapabilityIndex). In an illustrative use case, a component of the UE includes processing circuitry configured to process configuration information received from a base station, the configuration information associated with channel state information (CSI) group-based reporting.

In an example, the operational flow/algorithmic structure 800 includes, at 804, sending, to the base station, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel. For example, the capability information is sent in fields of a CSI-group based report as illustrated in FIG. 4 or as standalone capability index report as illustrated in FIG. 5. In an illustrative use case, the processing circuitry of the UE is further configured to cause capability index information to be sent to the base station, the capability index information indicating a set of capability indexes associated with the CSI group-based reporting, wherein for each antenna panel of a plurality of antenna panels of the apparatus, the set of capability indexes indicates a set of antenna ports usable for uplink transmission from the antenna panel.

In an example, the operational flow/algorithmic structure 800 includes, at 806, performing, based on the set of capability indexes, simultaneous uplink transmissions to the base station using the plurality of antenna panels. For example, the base station can indicate the channels to use for the simultaneous uplink transmissions based on a CSI report from the UE (e.g., in situations where reciprocity is assumed between downlink channels on which the CSI-RSs were sent and uplink channels). This CSI report can be a CSI group-based report that includes the capability index information. In an illustrative use case, the processing circuitry of the UE is further configured to cause, based on the set of capability indexes, simultaneous uplink transmissions to the base station to be performed using the plurality of antenna panels.

FIG. 9 illustrates example of an operational flow/algorithmic structure 900 for a base station to, at least in part, receive UE capability associated with simultaneous uplink transmissions, in accordance with some embodiments. The base station is an example of any of the base stations described in the present disclosure. The operational flow/algorithmic structure 900 can be performed by the base station as a whole and/or by particular components thereof.

In an example, the operational flow/algorithmic structure 900 includes, at 902, sending, to a user equipment (UE) configuration information associated with channel state information (CSI) group-based reporting. For example, the base station CSI configuration information that includes a plurality of IEs related to CSI components (e.g., CQI, PMI, CRI, SSBRI, L1-RSRP, L1-SINR, etc.). The CSI configuration information can indicate, among other things, resources (e.g., a ResourceSet) that belong to a specific group to be used, a type of reference signals (e.g., CSI ResourceConfig), and/or which type of reference signals is to be used for measurements (e.g., CSI ReportConfig). Other information can also be provided to the UE 404, such as report type configurations (e.g., periodic, semi-persistent, or aperiodic) and the like. For a standalone capability index report, the CSI configuration information can also include an indicator of the standalone report (e.g., a reportConfigId), an indicator of a serving cell for which the standalone report is valid (e.g., a cell ID or any other information that indicate a carrier), a type of the standalone report (e.g., reportConfigType indicating whether the standalone report is a periodic, semi-persistent, or aperiodic report; this reportConfigType can be common to the CSI report), and a value for reporting a capability index (e.g., reportQuantity which can be a value introduced for reporting an index, such as a CapabilityIndex).

In an example, the operational flow/algorithmic structure 900 includes, at 904, receiving, from the UE, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel. For example, the capability information is received in fields of a CSI-group based report as illustrated in FIG. 4 or as standalone capability index report as illustrated in FIG. 5.

In an example, the operational flow/algorithmic structure 900 includes, at 906, receiving, based on the set of capability indexes, simultaneous uplink transmissions from the UE using the plurality of antenna panels. For example, the base station can indicate the channels to use for the simultaneous uplink transmissions based on a CSI report from the UE (e.g., in situations where reciprocity is assumed between downlink channels on which the CSI-RSs were sent and uplink channels). This CSI report can be a CSI group-based report that includes the capability index information.

Figure 10:
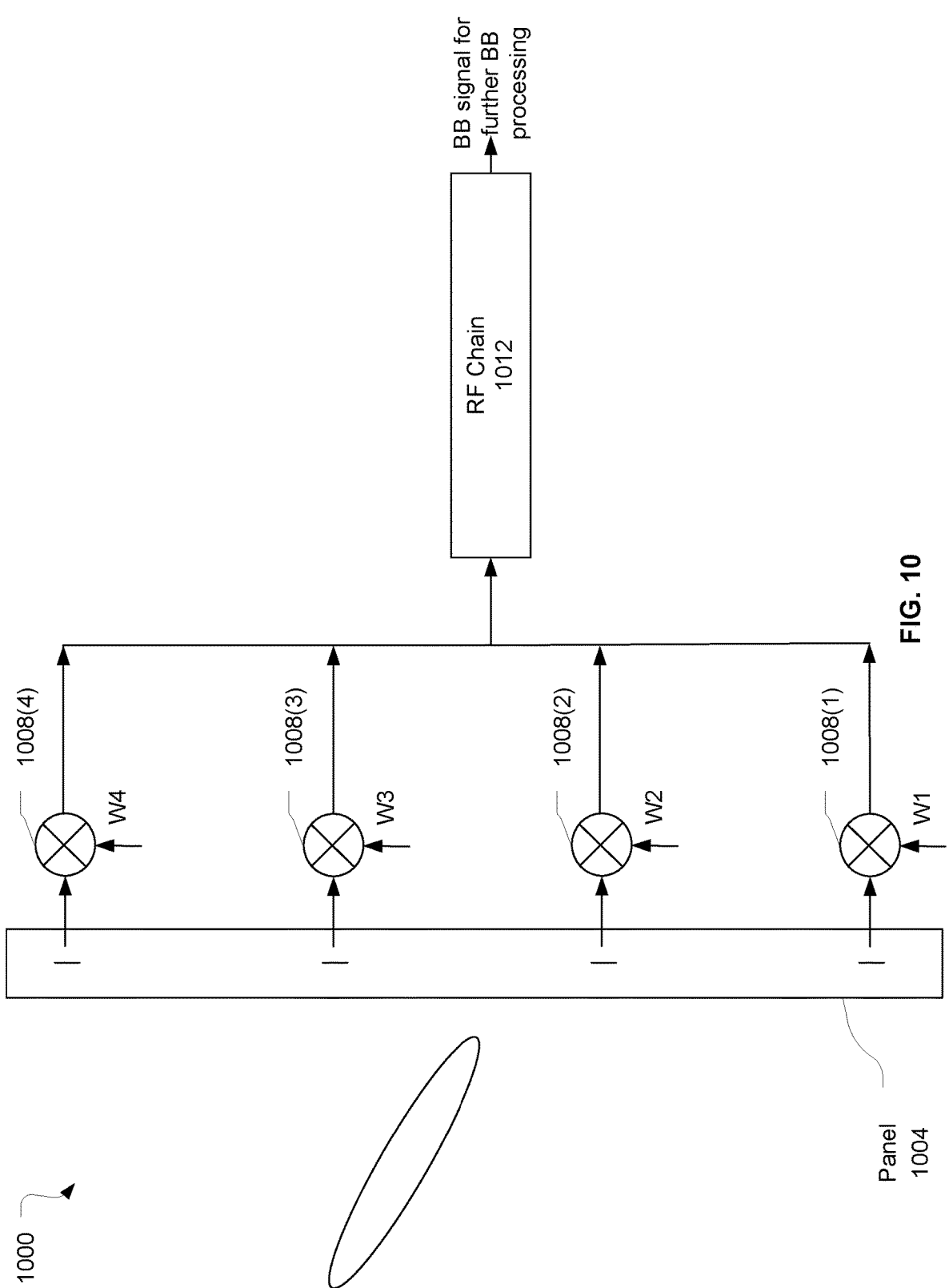
FIG. 10 illustrates an example of receive components, in accordance with some embodiments.

FIG. 10 illustrates receive components 1000 of the UE 104, in accordance with some embodiments. A device, such as one described in any of the above figures, can include similar receive components. The receive components 1000 may include an antenna panel 1004 that includes a number of antenna elements. The panel 1004 is shown with four antenna elements, but other embodiments may include other numbers.

The antenna panel 1004 may be coupled to analog beamforming (BF) components that include a number of phase shifters 1008(1)-1008(4). The phase shifters 1008(1)-1008(4) may be coupled with a radio-frequency (RF) chain 1012. The RF chain 1012 may amplify a receive analog RF signal, down-convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1008(1)-1008(4) to provide a receive beam at the antenna panel 1004. These BF weights may be determined based on the channel-based beamforming.

Figure 11:
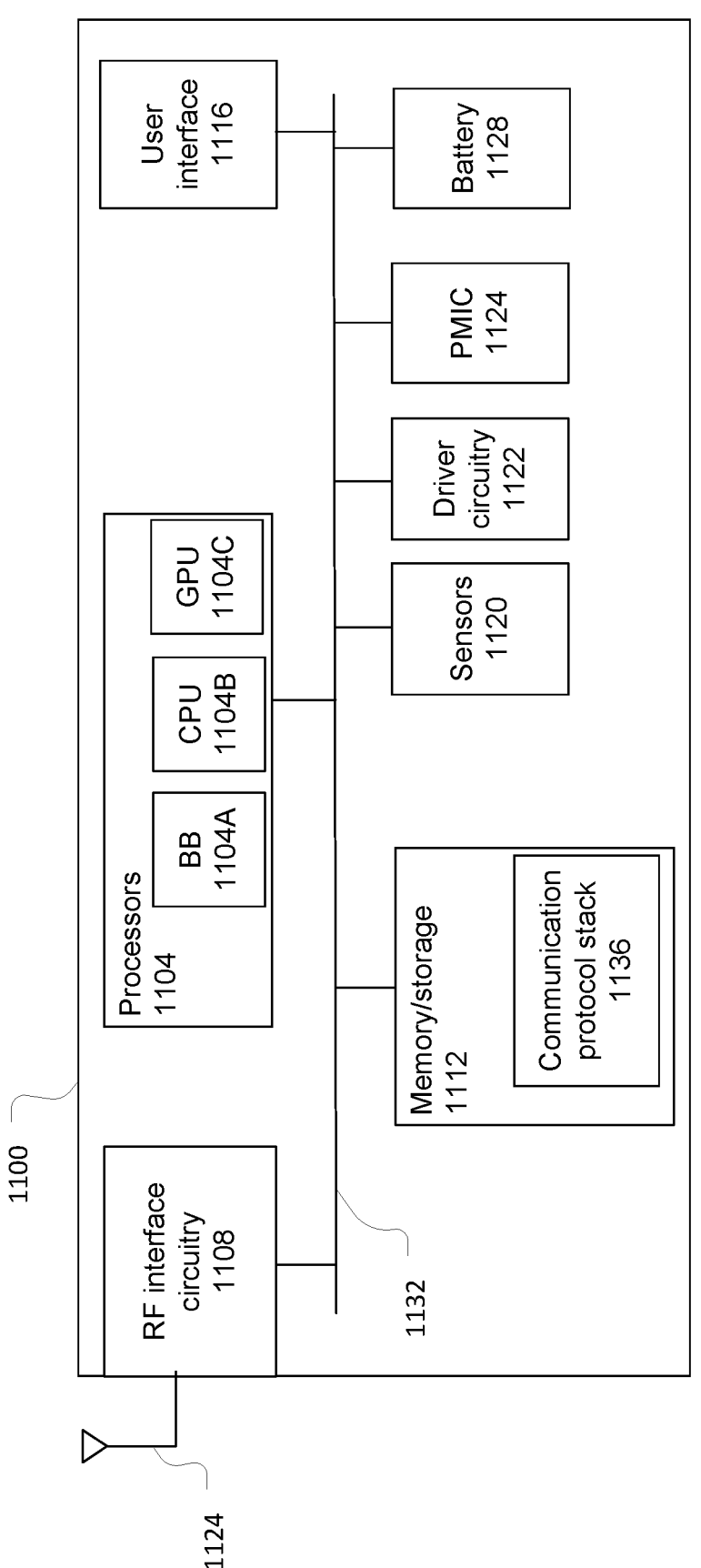
FIG. 11 illustrates an example of a UE, in accordance with some embodiments.

FIG. 11 illustrates a UE 1100 in accordance with some embodiments. The UE 1100 may be similar to and substantially interchangeable with UE 104 of FIG. 1.

Similar to that described above with respect to UE 104, the UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras, and video cameras), wearable devices, or relaxed-IoT devices. In some embodiments, the UE may be a reduced capacity UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangements of the components shown may occur in other implementations.

The components of the UE 1100 may be coupled with various other components over one or more interconnects 1132 which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 1104A may also access group information 1124 from memory/storage 1112 to determine search space groups in which a number of repetitions of a PDCCH may be transmitted.

The memory/storage 1112 may include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and a radio frequency front module (RFEM) that allows the UE 1100 to communicate with other devices over a radio access network. The RF interface circuitry 1108 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1124 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1124.

In various embodiments, the RF interface circuitry 1108 may be configured to transmit/receive signals in a manner compatible with NR access technologies.

The antenna 1124 may include a number of antenna elements that each convert electrical signals into radio waves to travel through the air and to convert received radio waves into electrical signals. The antenna elements may be arranged into one or more antenna panels. The antenna 1124 may have antenna panels that are omnidirectional, directional, or a combination thereof to enable beamforming and multiple input, multiple output communications. The antenna 1124 may include micro-strip antennas, printed antennas that are fabricated on the surface of one or more printed circuit boards, patch antennas, phased array antennas, etc. The antenna 1124 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within or connected to the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, or audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 1128 may power the UE 1100, although in some examples the UE 1100 may be mounted deployed in a fixed location and may have a power supply coupled to an electrical grid. The battery 1128 may be a lithium-ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
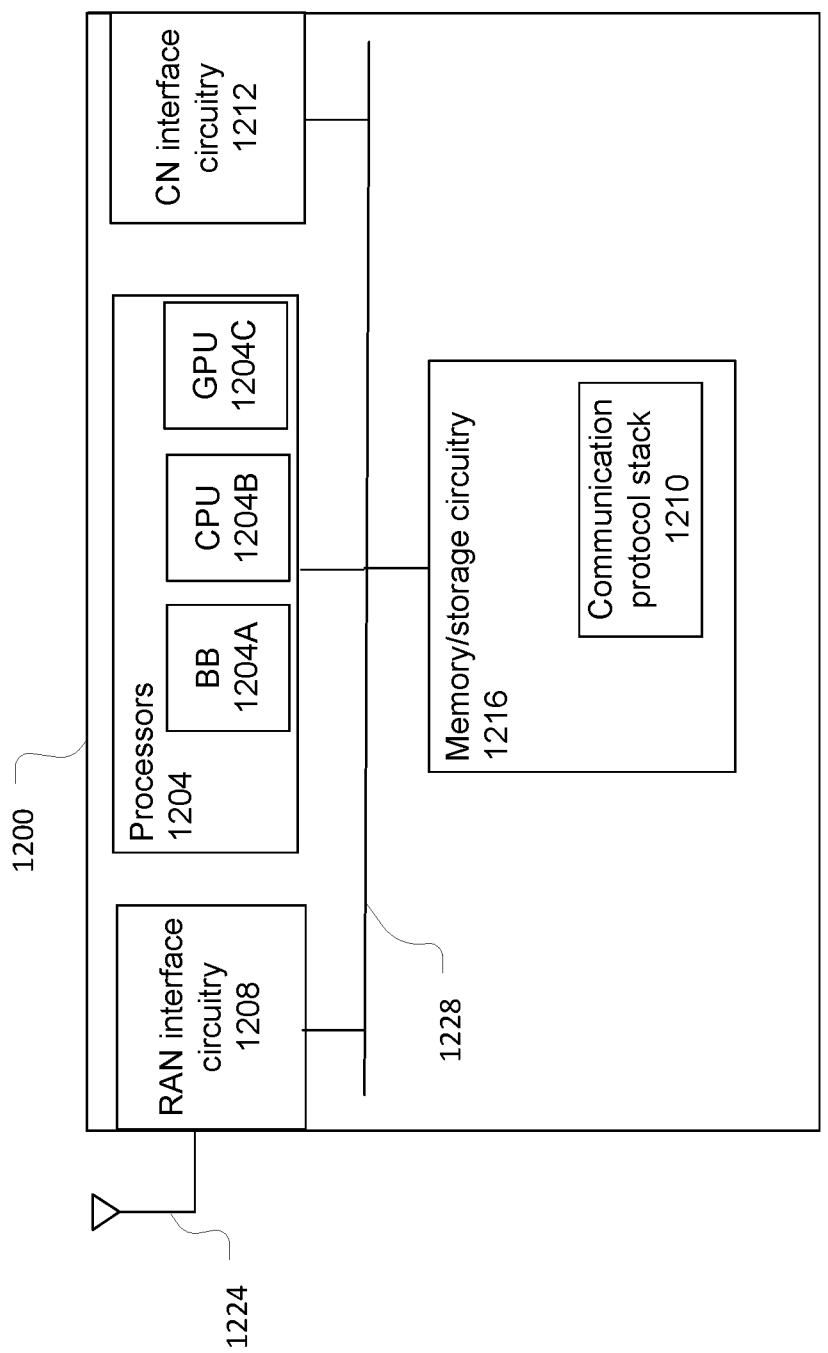
FIG. 12 illustrates an example of a base station, in accordance with some embodiments.

FIG. 12 illustrates a gNB 1200 in accordance with some embodiments. The gNB node 1200 may be similar to and substantially interchangeable with gNB 108. A base station can have the same or similar components as the gNB 1200.

The gNB 1200 may include processors 1204, RF interface circuitry 1208, core network (CN) interface circuitry 1212, and memory/storage circuitry 1216.

The components of the gNB 1200 may be coupled with various other components over one or more interconnects 1228.

The processors 1204, RF interface circuitry 1208, memory/storage circuitry 1216 (including communication protocol stack 1210), antenna 1224, and interconnects 1228 may be similar to like-named elements shown and described with respect to FIG. 10.

The CN interface circuitry 1212 may provide connectivity to a core network, for example, a $5^{th}$ Generation Core network (5GC) using a 5GC-compatible network interface protocol, such as carrier Ethernet protocols or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

EXAMPLES

In the following sections, further exemplary embodiments are provided.

Example 1 includes a method implemented by a user equipment (UE), the method comprising: receiving, from a base station, configuration information associated with channel state information (CSI) group-based reporting; sending, to the base station, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel; and performing, based on the set of capability indexes, simultaneous uplink transmissions to the base station using the plurality of antenna panels. In an illustrative use case, the method is implemented by a component of the UE, such as by a processor(s) thereof (e.g., the processors 1104), where the component includes processing circuitry and interface circuitry coupled with the processing circuitry, the interface circuitry configured to communicatively couple the processing circuitry with another component of the apparatus. In this case, the processing circuitry is configured to process configuration information received from a base station, the configuration information associated with channel state information (CSI) group-based reporting; cause capability index information to be sent to the base station, the capability index information indicating a set of capability indexes associated with the CSI group-based reporting, wherein for each antenna panel of a plurality of antenna panels of the apparatus, the set of capability indexes indicates a set of antenna ports usable for uplink transmission from the antenna panel; and cause, based on the set of capability indexes, simultaneous uplink transmissions to the base station to be performed using the plurality of antenna panels. Accordingly, the method in this illustrative use case includes processing configuration information received from a base station, the configuration information associated with channel state information (CSI) group-based reporting; causing capability index information to be sent to the base station, the capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel; and causing, based on the set of capability indexes, simultaneous uplink transmissions to the base station to be performed using the plurality of antenna panels.

Example 2 includes a method implemented by a base station, the method comprising: sending, to a user equipment (UE) configuration information associated with channel state information (CSI) group-based reporting; receiving, from the UE, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel; and receiving, based on the set of capability indexes, simultaneous uplink transmissions from the UE using the plurality of antenna panels.

Example 3 includes the method of any example 1-2, wherein the capability index information is included in a CSI group-based report.

Example 4 includes the method of example 3, wherein the CSI group-based report includes a first capability index corresponding to a first panel of the plurality of antenna panels and a second capability index corresponds to a second antenna panel of the plurality of antenna panels.

Example 5 includes the method of example 4, wherein the CSI group-based report associates the first capability index with a first resource group of CSI resources and the second capability index with the first resource group or a second resource group of CSI resources.

Example 6 includes the method of example 3, wherein the CSI group-based report includes a first capability index corresponding to a first panel of the plurality of antenna panels and to a second antenna panel of the plurality of antenna panels.

Example 7 includes the method of example 6, wherein the CSI group-based report associates the first capability index with a first resource group of CSI resources.

Example 8 includes the method of any example 1-2, wherein the capability index information is included in a standalone report different from a CSI group-based report.

Example 9 includes the method of example 8, wherein the standalone report excludes metrics of the CSI group-based report.

Example 10 includes the method of example 8, wherein the standalone report includes, in addition to the capability index information, at least one of transmission configuration indication (TCI) state identifier or a sounding reference signal (SRS) resource set identifier.

Example 11 includes the method of example 8, wherein a plurality of transmission configuration indication (TCI) states is indicated or activated for the simultaneous uplink transmissions, and wherein the standalone report includes a first capability index that is mapped to a first TCI state of the plurality of TC states, wherein the first TCI state represents an antenna panel of the plurality of antenna panels.

Example 12 includes the method of example 8, wherein the configuration information indicates a plurality of sounding reference signal (SRS) resource sets for physical uplink shared channel (PUSCH) operations, and wherein the standalone report includes a first capability index that is mapped to a first SRS resource set of the plurality of SRS resource sets.

Example 13 includes the method of example 8, wherein the configuration information indicates a control resource set (CORESET) group or pool index, and wherein the standalone report includes a first capability index that is mapped to the CORESET group or pool index.

Example 14 includes the method of any example 1-2, wherein the capability index information is included in a standalone report different from a CSI group-based report, wherein the configuration information includes a first plurality of information elements that configure the UE to send the standalone report, wherein the first plurality of information elements includes an indicator of the standalone report, an indicator of a serving cell for which the standalone report is valid, a type of the standalone report, and a value for reporting a capability index.

Example 15 includes the method of example 14, wherein the configuration information includes a second plurality of information elements that configure the UE to perform the CSI group-based reporting, and wherein the standalone report is generated independently of the second plurality of information elements.

Example 16 includes the method of any example 1-2, wherein the capability index information is included in a standalone report different from a CSI group-based report and is initiated by the UE absent a trigger from the base station.

Example 17 includes the method of example 1-2, wherein the capability index information is included in a CSI group-based report and is initiated by the UE absent a trigger from the base station.

Example 18 includes the method of any example 1-1, wherein the capability index information is sent in a report, wherein the report is initiated by the UE based on a set of conditions and absent a trigger from the base station, wherein the set of conditions includes at least one of: a transmission configuration indication (TCI) state being indicated or activated, a sounding reference signal (SRS) resource set being reconfigured for uplink transmission, a power headroom (PHR) change exceeding a first threshold, or a power management maximum power reduction (P-MPR) change exceeding a second threshold.

Example 19 includes the method of any example 1-2, wherein the capability index information is sent in a report, wherein the report is initiated by the UE based on a physical random access channel (PRACH) transmission, a scheduling request (SR) transmission, or an existing uplink grant.

Example 20 includes the method of any example 1-2, wherein the capability index information is sent in uplink control information (UCI), a medium access control (MAC) control element (CE), or a radio resource control (RRC) message.

Example 21 includes the method of any example 1-2, wherein the capability index information is included in a standalone report different from a CSI group-based report, wherein the standalone report is sent in uplink control information (UCI) and indicates at least a first capability index, and wherein the first capability index has a same priority as or a different priority than the CSI group-based report.

Example 22 includes the method of example 2, wherein the capability index information is a first capability index information, and wherein the method further comprises: receiving, from the UE, second capability index information indicating a first capability index corresponding to a first antenna panel of the plurality of antenna panels and having a first value from a plurality of possible values, wherein the first value indicates that the first antenna panel is deactivated.

Example 23 includes the method of example 22, wherein the second capability index information includes a second capability index corresponding to a second antenna panel of the plurality of antenna panels and having a second value, wherein the second value indicates that the second antenna panel is activated based on the first value indicating that the first antenna panel is deactivated.

Example 24 includes the method of any example 1-2, wherein the capability index information includes a first capability index corresponding to a first antenna panel of the plurality of antenna panels and having a first value from a plurality of possible values, wherein a maximum of the plurality of possible values is larger than four.

Example 25 includes the method of any example 1-2 or 24, wherein the set of capability indexes has a size that is larger than four.

Example 26 includes the method of any example 1-2 or 24-25, wherein the set of capability indexes includes a first set of capability indexes corresponding to a first antenna panel of the plurality of antenna panels and a second set of capability indexes correspond to a second antenna panel of the plurality of antenna panels.

Example 27 includes the method of any example 1-2 or 24-26, wherein the set of capability indexes is common to a first antenna panel of the plurality of antenna panels and a second antenna panel of the plurality of antenna panels.

Example 28 includes a device comprising means to perform one or more elements of a method described in or related to any of the examples 1-27.

Example 29 includes one or more non-transitory computer-readable media comprising instructions to cause a device, upon execution of the instructions by one or more processors of the device, to perform one or more elements of a method described in or related to any of the examples 1-27.

Example 30 includes a device comprising logic, modules, or circuitry to perform one or more elements of a method described in or related to any of the examples 1-27.

Example 31 includes a device comprising: one or more processors and one or more computer-readable media comprising instructions that, when executed by the one or more processors, cause the one or more processors to perform one or more elements of a method described in or related to any of the examples 1-27.

Example 32 includes a system comprising means to perform one or more elements of a method described in or related to any of the examples 1-27.

Example 33 includes a network comprising means to perform one or more elements of a method described in or related to any of the examples 1-27.

Example 34 includes one or more non-transitory computer-readable media comprising instructions to cause a network, upon execution of the instructions by one or more processors of the network, to perform one or more elements of a method described in or related to any of the examples 1-27.

Example 35 includes a network comprising logic, modules, or circuitry to perform one or more elements of a method described in or related to any of the examples 1-27.

Example 36 includes a network comprising: one or more processors and one or more computer-readable media comprising instructions that, when executed by the one or more processors, cause the one or more processors to perform one or more elements of a method described in or related to any of the examples 1-27.

Example 37 includes a component to be implemented in an apparatus (where the apparatus can be any of the apparatuses described herein above such as a UE, a network, or a base station), the component comprising: processing circuitry configured to perform one or more elements of a method described in or related to any of the examples 1-27, and interface circuitry coupled with the processing circuitry, the interface circuitry configured to communicatively couple the processing circuitry with another component of the apparatus.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations, and modifications will become apparent to those skilled in the art once the above disclosure is fully appreciated. It is intended that the following claims be interpreted to embrace all such variations and modifications.

What is claimed is:

1. A method comprising:
processing configuration information received from a base station, the configuration information associated with channel state information (CSI) group-based reporting;
causing capability index information to be sent to the base station, the capability index information indicating a set of capability indexes associated with the CSI group-based reporting, wherein for each antenna panel of a plurality of antenna panels of a user equipment (UE), the set of capability indexes indicates a set of antenna ports usable for uplink transmission from the antenna panel, the capability index information sent based on a UE-initiated trigger and absent a request of the base station for the capability index information; and
causing, based on the set of capability indexes, simultaneous uplink transmissions to the base station to be performed using the plurality of antenna panels.

2. The method of claim 1, wherein the capability index information is included in a CSI group-based report, wherein the CSI group-based report includes a first capability index corresponding to a first panel of the plurality of antenna panels and a second capability index corresponds to a second antenna panel of the plurality of antenna panels.

3. The method of claim 2, wherein the CSI group-based report associates the first capability index with a first resource group of CSI resources and the second capability index with the first resource group or a second resource group of CSI resources.

4. The method of claim 1, wherein the capability index information is included in a CSI group-based report, wherein the CSI group-based report includes a first capability index corresponding to a first panel of the plurality of antenna panels and to a second antenna panel of the plurality of antenna panels, and wherein the CSI group-based report associates the first capability index with a first resource group of CSI resources.

5. The method of claim 1, wherein the capability index information is included in a standalone report different from a CSI group-based report, wherein the standalone report excludes metrics of the CSI group-based report.

6. The method of claim 1, wherein the capability index information is included in a standalone report different from a CSI group-based report, wherein the standalone report includes, in addition to the capability index information, at least one of transmission configuration indication (TCI) state identifier or a sounding reference signal (SRS) resource set identifier.

7. The method of claim 1, wherein the capability index information is included in a standalone report different from a CSI group-based report, wherein a plurality of transmission configuration indication (TCI) states is indicated or activated for the simultaneous uplink transmissions, and wherein the standalone report includes a first capability index that is mapped to a first TCI state of the plurality of TCI states, wherein the first TCI state represents an antenna panel of the plurality of antenna panels.

8. The method of claim 1, wherein the capability index information is sent in a standalone report different from a CSI group-based report.

9. A baseband processor comprising:
processing circuitry configured to:
process configuration information received from a base station, the configuration information associated with channel state information (CSI) group-based reporting;
cause capability index information to be sent to the base station, the capability index information indicating a set of capability indexes associated with the CSI group-based reporting, wherein for each antenna panel of a plurality of antenna panels of an apparatus, the set of capability indexes indicates a set of antenna ports usable for uplink transmission from the antenna panel, the capability index information sent based on a apparatus-initiated trigger and absent a request of the base station for the capability index information; and
cause, based on the set of capability indexes, simultaneous uplink transmissions to the base station to be performed using the plurality of antenna panels; and
interface circuitry coupled with the processing circuitry, the interface circuitry configured to communicatively couple the processing circuitry with a component of an apparatus.

10. The baseband processor of claim 9, wherein the capability index information is included in a standalone report different from a CSI group-based report, wherein the configuration information indicates a plurality of sounding reference signal (SRS) resource sets for physical uplink shared channel (PUSCH) operations, and wherein the standalone report includes a first capability index that is mapped to a first SRS resource set of the plurality of SRS resource sets.

11. The baseband processor of claim 9, wherein the capability index information is included in a standalone report different from a CSI group-based report, wherein the configuration information indicates a control resource set (CORESET) group or pool index, and wherein the standalone report includes a first capability index that is mapped to the CORESET group or pool index.

12. The baseband processor of claim 9, wherein the capability index information is included in a standalone report different from a CSI group-based report, wherein the configuration information includes a first plurality of information elements that configure the apparatus to send the standalone report, wherein the first plurality of information elements includes an indicator of the standalone report, an indicator of a serving cell for which the standalone report is valid, a type of the standalone report, and a value for reporting a capability index, wherein the configuration information includes a second plurality of information elements that configure the apparatus to perform the CSI group-based reporting, and wherein the standalone report is generated independently of the second plurality of information elements.

13. The baseband processor of claim 9, wherein the capability index information is included in a CSI group-based report or in a standalone report different from the CSI group-based report and is initiated by the apparatus.

14. The baseband processor of claim 9, wherein the capability index information is sent in a report, wherein the report is initiated by the apparatus based on a set of conditions, wherein the set of conditions includes at least one of: a transmission configuration indication (TCI) state being indicated or activated, a sounding reference signal (SRS) resource set being reconfigured for uplink transmission, a power headroom (PHR) change exceeding a first threshold, or a power management maximum power reduction (P-MPR) change exceeding a second threshold.

15. The baseband processor of claim 9, wherein the capability index information is sent in a report, wherein the report is initiated by the apparatus based on a physical random access channel (PRACH) transmission, a scheduling request (SR) transmission, or an existing uplink grant.

16. The baseband processor of claim 9, wherein the capability index information is included in a standalone report different from a CSI group-based report, wherein the standalone report is sent in uplink control information (UCI) and indicates at least a first capability index, and wherein the first capability index has a same priority as or a different priority than the CSI group-based report.

17. A method comprising:

sending, to a user equipment (UE) configuration information associated with channel state information (CSI) group-based reporting;

receiving, from the UE, capability index information indicating a set of capability indexes associated with the CSI group-based reporting, wherein for each antenna panel of a plurality of antenna panels of the UE, the set of capability indexes indicates a set of antenna ports usable for uplink transmission from the antenna panel, the capability index information received based on a UE-initiated trigger and absent a request of a base station for the capability index information; and receiving, based on the set of capability indexes, simultaneous uplink transmissions from the UE using the plurality of antenna panels.

18. The method of claim 17, wherein the capability index information is a first capability index information, and wherein the method further comprises:

receiving, from the UE, second capability index information indicating a first capability index corresponding to a first antenna panel of the plurality of antenna panels and having a first value from a plurality of possible values, wherein the first value indicates that the first antenna panel is deactivated, wherein the second capability index information includes a second capability index corresponding to a second antenna panel of the plurality of antenna panels and having a second value, wherein the second value indicates that the second antenna panel is activated based on the first value indicating that the first antenna panel is deactivated.

19. The method of claim 17, wherein the capability index information includes a first capability index corresponding to a first antenna panel of the plurality of antenna panels and having a first value from a plurality of possible values, wherein a maximum of the plurality of possible values is larger than four.

20. The method of claim 17, wherein the set of capability indexes has a size that is larger than four, and wherein the set of capability indexes includes a first set of capability indexes corresponding to a first antenna panel of the plurality of antenna panels and a second set of capability indexes correspond to a second antenna panel of the plurality of antenna panels.

* * * * *